United States Patent
Abe et al.

(10) Patent No.: US 6,994,053 B2
(45) Date of Patent: Feb. 7, 2006

(54) ASSEMBLING STRUCTURE OF INDICATING NEEDLE FOR INSTRUMENT AND ASSEMBLING METHOD

(75) Inventors: Shotaro Abe, Tokyo (JP); Hideyuki Takahashi, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 10/782,603

(22) Filed: Feb. 18, 2004

(65) Prior Publication Data

US 2004/0159281 A1    Aug. 19, 2004

(30) Foreign Application Priority Data

Feb. 18, 2003  (JP)  ............... 2003-039899

(51) Int. Cl.
*G01D 13/00* (2006.01)
(52) U.S. Cl. ............. 116/284; 116/285; 116/DIG. 6
(58) Field of Classification Search ........ 116/284–286, 116/296–297, 303, 305, DIG. 6
See application file for complete search history.

(56) References Cited

U.S. PATENT DOCUMENTS

| | | | | | |
|---|---|---|---|---|---|
| 2,924,022 | A | * | 2/1960 | Callahan | 33/346 |
| 5,017,862 | A | * | 5/1991 | Brooks | 324/145 |
| 5,267,526 | A | * | 12/1993 | Totsuka | 116/291 |
| 6,470,822 | B2 | * | 10/2002 | Adams et al. | 116/284 |
| 6,854,416 | B2 | * | 2/2005 | Breinich et al. | 116/202 |

FOREIGN PATENT DOCUMENTS

JP      2001-317970      11/2001

* cited by examiner

*Primary Examiner*—Christopher W. Fulton
*Assistant Examiner*—Tania Courson

(57) ABSTRACT

A assembling structure of an indicating needle for an instrument includes a case body having an upper case and a lower case (13), an indicating needle shaft (19) rotatably pivoted by the upper case and the lower case, and a top portion (19A) of the indicating needle shaft is projected to outside from the upper caser (13), and an indicating needle (32) provided on the projection. A concave portion (34) is provided on a shift supporting portion of the indicating needle shaft (19) in a bottom surface of the lower case, a lower end portion (19B) of the indicating needle shaft (19) is projected into the concave portion (34), and the projection amount is smaller than the depth of the concave portion (34).

5 Claims, 5 Drawing Sheets

ASSEMBLING STRUCTURE OF INDICATING NEEDLE FOR INSTRUMENT AND ASSEMBLING METHOD

BACKGROUND OF THE INVENTION

1. Field of the Invention

The present invention relates to an assembling structure and an assembling method of an indicating needle to an indicating needle shaft in a stepping motor incorporated instrument.

2. Description of Prior Art

Generally, an instrument such as a speed meter for a vehicle, and the like is provided with a case body 3 comprising an upper case 1 and a lower case 2, and an indicating needle 5 is rotatably pivoted at an upper portion to the upper case 1, and at a lower portion to the lower case 2, respectively, and also has a gear 4 at an intermediate portion. A top portion 5A of the indicating needle shaft 5 is projected outside from the upper case 1, and is provided with an indicating needle 6.

A press fit method is generally used for assembling the indicating needle 6 to the top portion 5A of the indicating needle shaft 5. That is, generally, the case body 3 is flatly placed on a base (not shown), directing the indicating needle shaft 5A in a direction perpendicular to the case body 3, and with this state, a hole 6A for the indicating needle 6 is aligned with the top portion 5A of the indicating needle shaft 5, then the indicating needle 6 is pressed into the top portion 5A of the indicating needle shaft 5 by pressing the indicating needle 6 downwardly as shown by the allow in FIG. 7.

However, a conventional instrument for a vehicle comprises a concave shaft bearing 2A inside the lower case 2, and has a structure that a lower end portion 5B for the indicating needle shaft 6 is pivoted by this shaft bearing 2A, so that the lower case 2 locally receives considerable strength from the indicating needle shaft 5 when the indicating needle 6 is pressed into the shaft. The case body including the lower case 2 is made of synthetic resin, and if the case body 3 locally receives considerable strength, it is deformed and causes problems for the strength.

As shown in FIG. 8, there is a method for spreading the strength that applies to the lower case 2 when the indicating needle 6 is pressed, by bringing a boss 4A of the gear 4, which is in the intermediate portion of the indicating needle shaft 5 into contact with a projection 2B inside the lower case 2. However, the method is not enough for protecting the lower case 2 from the deformation, and also the gear may be deformed.

Accordingly, there has been proposed a method that a through-hole is formed on a lower case, a jig is mounted to the lower side of the lower case while the lower end portion of the indicating needle shaft is inserted into the through-hole, then with the state that the leading end of the lower end portion of the indicating needle is positioned on the jig, an indicating needle is pressed into the leading end of the top portion of the indicating needle shaft, so that the strength, when the indicating needle is pressed, does not directly apply to the lower case. (For example, Japanese Patent Laid-Open 2001-317970)

However, the above described prior art the through-hole is provided on the plane bottom surface of the lower case, and the opening edge portion of the through-hole and the bottom surface of the lower case have the same height. Therefore, there is a problem if the lower end portion of the indicating needle is inserted into the through-hole, the leading edge of the lower end portion of the indicating needle shaft is projected from the bottom surface of the lower case. If the leading end of the lower end portion of the indicating needle is projected from the bottom surface of the lower case, it takes time for packaging, and a package case becomes bigger. Moreover, there may be a case that the indicating needle may be deformed by shock from the outside.

When the through-hole of the lower case is processed, flashes are generated on the rim of the through-hole. Moreover, for the prior art, the opening edge portion of the through-hole and the bottom surface of the lower case have the same height, so that the rim of the through-hole is easy to be hit by another component, and if the rim of the through-hole is hit by another component, flushes are entered inside the through-hole, and it becomes a problem for stabilizing the rotation of the indicating needle shaft.

SUMMARY OF THE INVENTION

It is, therefore, an object of the present invention to provide an assembling structure of an indicating needle for an instrument and an assembling method which can assemble an indicating needle without deforming a lower case while protecting a projection of a leading end of lower end portion of an indicating needle shaft from the bottom surface of the lower case.

In order to achieve the above object, according to an embodiment of the present invention, an assembling structure of an indicating needle for an instrument comprises a case body including an upper case and a lower case, an indicating needle shaft rotatably pivoted by the upper case and the lower case and a top portion of the indicating needle shaft is projected to an outside from the upper case, and an indicating needle mounted on the projection of said indicating needle shaft. A concave portion is provided on a shift supporting portion of the indicating needle shaft in a bottom surface of the lower caser, and a lower end portion of the indicating needle shaft is projected into the concave portion, and the projection amount is smaller than a depth of the concave portion.

According to the above described structure, the leading end of the lower end portion of the indicating needle shaft is settled into the concave portion, and is not projected from the bottom surface of the lower case, so that packaging becomes easy. Moreover, a rim of a through-hole is hardly hit by another component, enabling the protection of the flash generated on the rim of the through-hole to be entered into the through-hole, so that the stabilized rotation of the indicating needle shaft is ensured.

According to an embodiment of the present invention, an indicating needle assembling method for mounting an indicating needle shaft on an indicating needle shaft in which each of a top portion and a lower end portion is rotatably pivoted by an upper case and a lower case, and a leading end of the top portion is projected to an outside from the upper case comprises the steps of providing a concave portion on a shift supporting portion of the indicating needle shaft in a bottom surface of the lower case, and projecting a lower portion of the indicating needle shift into the concave portion, and disposing a jig for receiving a lower end portion of the indicating needle shaft to a bottom surface side of the lower case when the indicating needle is pressed into a leading end of the top portion of the indicating needle shaft, and receiving a strength of the indicating needle pressure by the jig.

According to an embodiment of the present invention, a stepping motor incorporated instrument comprises a rotor, a stator, a coil attached to the stator, a case body including an upper case and a lower caser for housing the rotor, the stator, and the coil, an indicating needle shaft rotatably pivoted by the upper case and the lower case and a top portion of the indicating needle shaft is projected to an outside from the upper case, and an indicating needle provided on the projection of the indicating needle shaft. A concave portion is provided on a shift supporting portion of the indicating needle shaft in a bottom surface of the lower case, and a lower end portion of the indicating needle shaft is projected into the concave portion, and the projection amount is smaller than a depth of the concave portion.

DETAILED DESCRIPTION OF THE PREFERRED EMBODIMENTS

Hereinafter, an embodiment of the present invention will be described with accompanying views.

Figure 4:
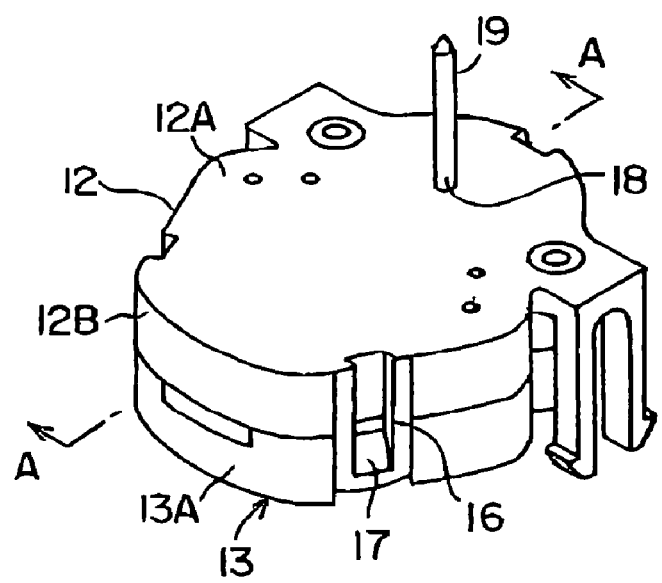
FIG. 4 is a perspective view illustrating the external appearance of a stepping motor incorporated instrument according to the present invention.
Figure 5:
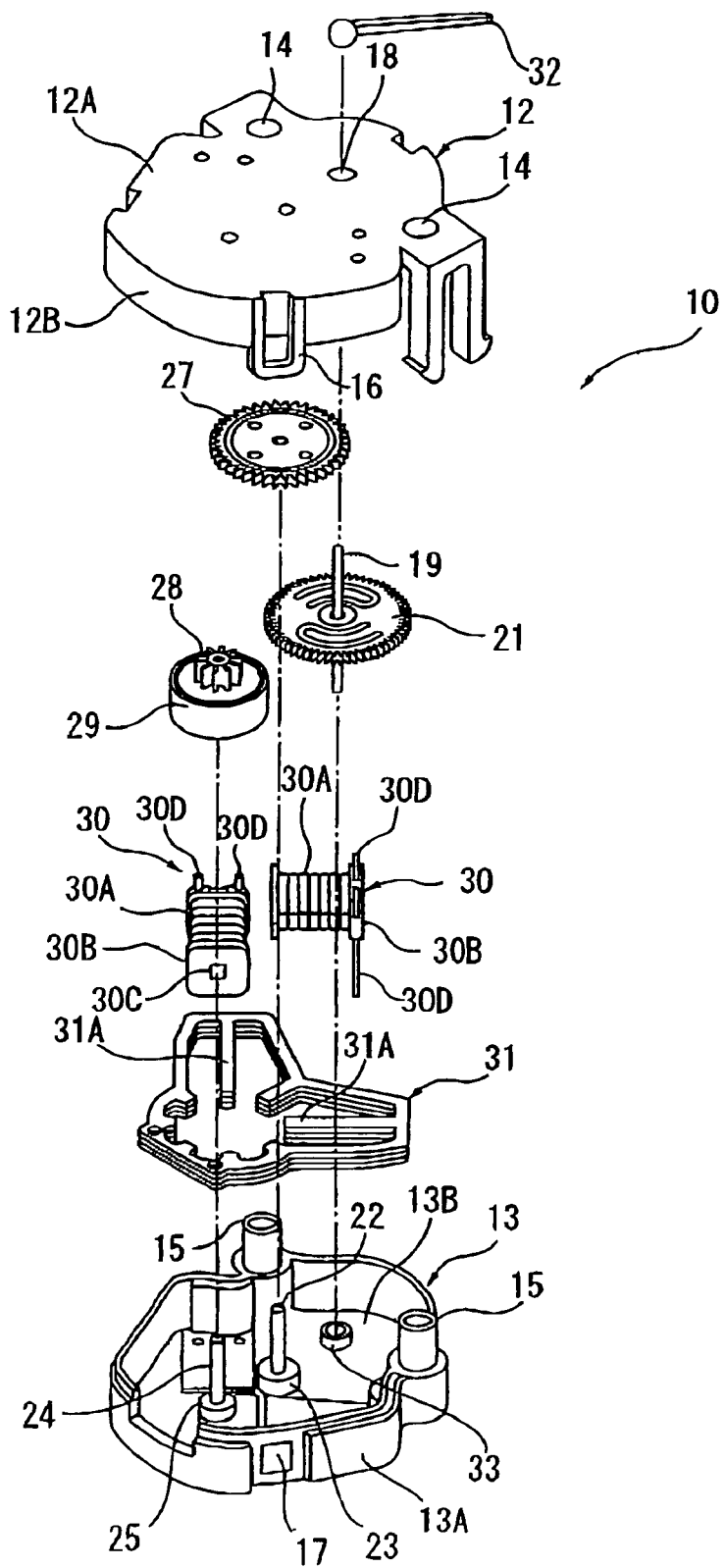
FIG. 5 is a perspective view illustrating a disassembled stepping motor incorporated instrument according to the present invention.
Figure 6:
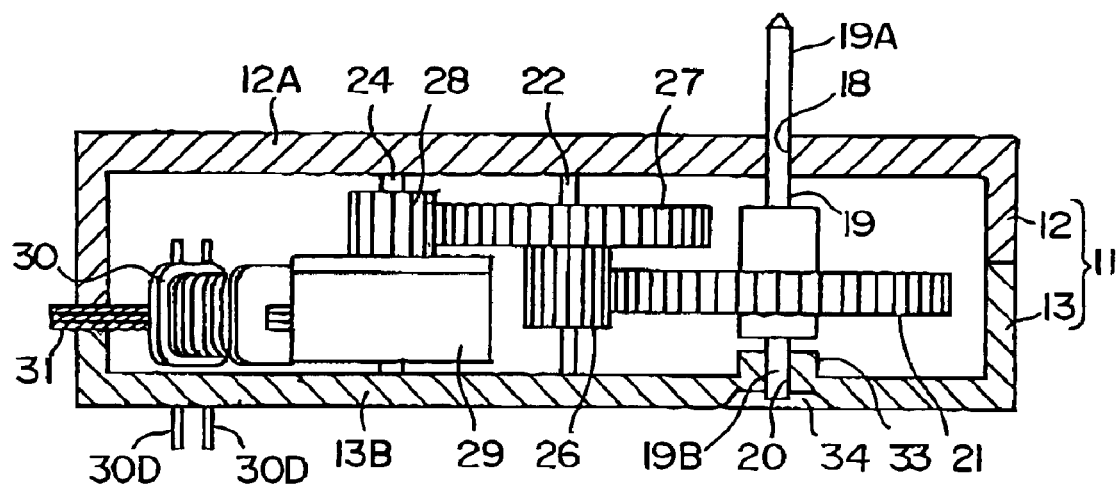
FIG. 6 is a cross section view along the line A—A in FIG. 4.
Figure 7:
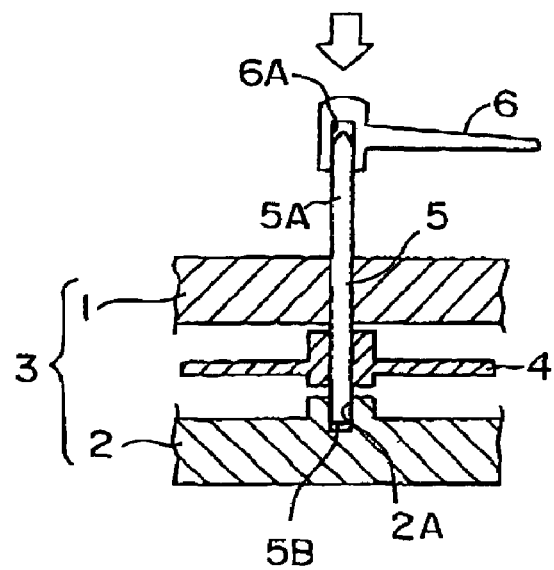
FIG. 7 is a cross section view illustrating a state that an indicating needle is pressed into an indicating needle shaft by a prior art.
Figure 8:
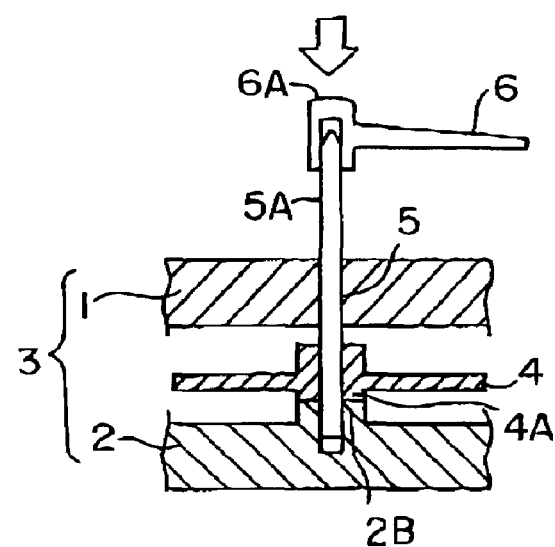
FIG. 8 is a cross section view illustrating a state that an inditing needle is pressed into an indicating needle shaft by another prior art.

FIGS. 4 to 6 illustrate stepping motor incorporated instruments according to the present embodiment, and FIG. 4 is a perspective view of the external appearance, FIG. 5 is the disassembled perspective view, and FIG. 6 is the cross sectional view along the line A—A in FIG. 4.

As illustrated in FIGS. 4 to 6, a stepping motor incorporated instrument 10 comprises a case body 11 made of synthetic resin, and the case body 11 includes an upper case 12 and a lower case 13. A pair of holes 14 is provided on an upper wall 12A of the upper case 12, and a pair of projections 15 corresponding to the holes 14 is provided on a side wall 13A of the lower case 13. The upper case 12 is aligned with the lower case 13 by fitting the projections 15 into the holes 14. A piece 16 is disposed on a side wall 12B of the upper case 12, and a projection 17 is disposed on the side wall 13A of the lower case 13. The upper case 12 and the lower case 13 are combined by engagement of the piece 16 with the projection 17.

A through-hole 18 is provided on the upper wall 12A of the upper case 12, and a top portion 19A of an inducing needle shaft 19 is inserted into the through-hole 18. A through-hole 20 is provided on a bottom wall 13B of the lower case 13, and a lower end portion 19B of the indicating needle shaft 19 is inserted into the through-hole 20. A gear 21 is fixed to the intermediate portion thereof.

The inside surface of the bottom wall 13B of the lower case 13 is provided with a supporting portion 25 for supporting a fixing shaft 24 and a supporting portion 23 for supporting a fixing shaft 22. A gear 26 engaging with the gear 21 and a gear 27 incorporated into a gear 26 are rotatably disposed to the fixing shaft 22. A gear 28 engaging with the gear 27 and a rotor 29 incorporated into the gear 28 are rotatably disposed to the fixing shaft 24.

A stator 31 having a pair of coils 30 disposed in the case body 11 comprising the upper case 12 and the lower case 13. The coil 30 includes a coil bobbin 30B with which a coil wire 30A is wound, and a hole 30C is provided on the end face of the coil bobbin 30B. A pole of a projection 31A of the stator 31 is inserted into the hole 30C, and the coil 30 is thereby fixed to the stator 31.

A plurality of terminals 30D is provided in the coil 30, and one of the terminals 30D is exposed to the outside by passing through the bottom wall 13B of the lower case 13. The top portion 19A of the indicating needle 19 is provided with an indicating needle 32.

In the above described structure, when a pulse signal is input to the coil wire 30A of the coil 30 through the terminals 30D, the rotor 29 rotates by the pulse, and the rotation is transmitted in the order of corresponding to the output gear 28, the gear 27, the gear 26, and the gear 21. At this point, the diameter of the output gear 28 is smaller than the diameter of the gear 27, and the diameter of the gear 26 is smaller than the diameter of the gear 21. Consequently, when the rotor 29 rotates, the reduced rotation speed is transmitted to the gear 21, enabling the indicating needle 32 to slowly rotate with the indicating needle shaft 19. The gear 27 and the gear 26 rotate together.

Next, a feature part of the present invention will be described.

Figure 2:
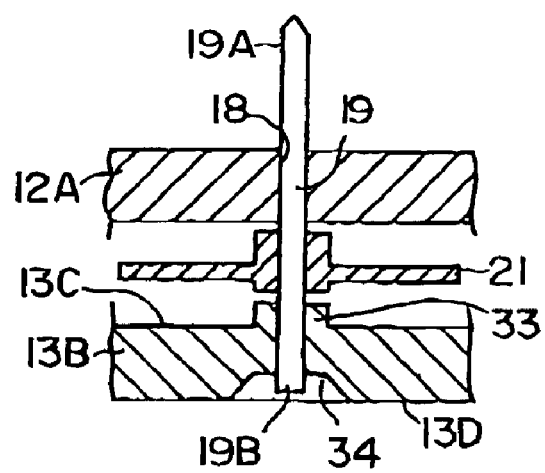
FIG. 2 is a cross section view illustrating an assembling structure of an indicating needle for an instrument according to the present invention, and a state before an indicating needle is pressed into an indicating needle shaft.

FIG. 2 illustrates a detailed structure of shaft bearing portion for rotatably pivoting the lower end portion 19B of the indicating needle shaft 19. As illustrated in FIG. 2, a columnar convex portion 33 is formed on an inner surface 13C of the bottom wall 13B of the lower case 13, and a conical concave portion 34 is formed on the bottom surface 13D. The through-hole 20 in which the lower end portion 19B of the indicating needle shaft 19 is inserted is provided through the convex portion 33 and the concave portion 34. The lower end portion 19B of the indicating needle shaft 19 is projected inside the concave portion 34, and the projection amount is shorter than the depth of the concave portion 34.

Figure 1:
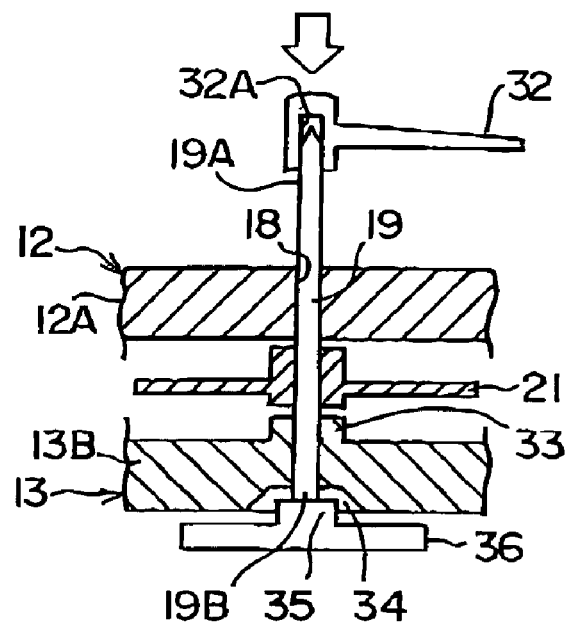
FIG. 1 is a cross section view illustrating an assembling structure of an indicating needle for an instrument according to the present invention, and a state that an indicating needle is pressed into an indicating needle shaft.

In the embodiment of the present invention, when the indicating needle 32 is disposed to the top portion 19A of the indicating needle shaft 19, a jig 36 having a columnar projection 35 is disposed onto the lower side of the bottom wall 13B of the lower case 13 as shown in FIG. 1. At this point, the projection 35 of the jig 36 is inserted into the concave portion 34 of the bottom wall 13B, and the upper surface of the projection 35 is attached to the bottom surface of the lower end portion 16B of the indicating needle shaft 16.

A hole 32A of the base portion of the indicating needle 32 is aligned with the top portion 19A of the indicating needle shaft 19, and the indicating needle 32 is pressed into the downward direction, so that the indicating needle 32 is assembled to the indicating needle shaft 19. After the indicating needle 32 is assembled, the jig 36 is disassembled.

According to the present embodiment, the strength applying to the indicating needle shaft 19 when the indicating needle 32 is pressed into the indicating needle shaft 19 is received by the jig 36, and the strength is not applied to the bottom wall 13B of the lower case 13, so that the deformation of the bottom wall 13 B can be prevented.

The leading end of the lower end portion of the indicating needle shaft 19 is settled into the concave portion 34, and is not projected from the bottom surface of the lower case 13. As a result, the stepping motor incorporated instrument 10 is easily packaged.

Figure 3:
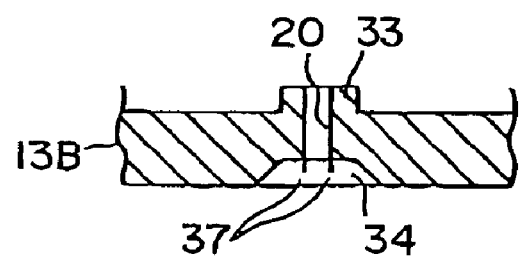
FIG. 3 is a cross section view illustrating a generation of flash on a rim of a through-hole.

When the through-hole 20 is formed on the bottom wall 13B of the lower case 13, the flash 37 may be generated on the rim of the concave portion 34 of the through-hole 20 as described in FIG. 3. If the flush 37 is included thereto, when the stepping motor incorporated instrument 10 is assembled, the flush 37 is attached to another component and enters to the through-hole 20, so that the flush 37 results in a generation of defect. However, according to the present embodiment, the through-hole 20 is opened in the concave portion 34, so it is possible to prevent that the flash 37 enters to the through-hole 20 although the flash 37 is generated. As a result, the stabilized rotation of the indicating needle shaft 19 can be maintained for a long term.

As described above, according to the present invention, the leading end of the lower end portion of the indicating needle shaft can be settled into the concave portion, and is not projected from the bottom surface of the lower case, so that it is easy to be packaged.

Furthermore, the through-hole is opened in the concave portion, so that the rim of the through-hole is hardly hit by another component. If the flash is generated on the rim of the through-hole, it is possible to protect the flash to be entered in the through-hole; enabling to maintain the stabilized rotation of the indicating needle shaft.

What is claimed is:

1. An assembling structure of an indicating needle for an instrument comprising:
    a case body including an upper case and a lower case to be attached to the upper case;
    an indicating needle shaft rotatably supported by said upper case and said lower case, having an upper end portion projecting to an outside from said upper case;
    an indicating needle to be mounted on the upper end portion of said indicating needle shaft; and
    a jig for supporting a lower end surface of the indicating needle shaft when assembling the indicating needle to the upper end portion of the indicating needle shaft;
    wherein a bottom wall of the lower case is provided with a through-hole in which the indicating needle shaft is inserted, and the jig supports the lower end surface of the indicating needle shaft inserted into the through-hole inside the bottom wall from a lower surface side of the bottom wall, when the indicating needle is pressed onto the upper end portion of the indicating needle shaft.

2. The assembling structure of an indicating needle for an instrument according to claim 1, wherein the jig includes a projection portion for supporting the lower end surface of the indicating needle shaft, and the lower surface of the bottom wall of the lower case is formed with a concave portion for receiving the projection portion of the jig in a portion in which the through-hole is provided.

3. An indicating needle assembling method for assembling an indicating needle on an upper end portion of an indicating needle shaft in which the upper end portion is rotatably supported by an upper case to project to an outside from said upper case and a lower end portion of the indicating needle shaft is rotatably supported by a lower case, comprising the steps of:
    inserting the lower end portion of the indicating needle shaft into a through-hole, which is formed in a bottom wall of the lower case, and communicates an interior portion of a concave portion formed in a position corresponding to a shaft supporting portion of the indicating needle shaft in a lower surface of the bottom wall and an interior portion of the lower case, so as to project in the interior portion of the concave portion without projecting out of the concave portion;
    placing a jig having a projection portion for supporting a lower end surface of the indicating needle shaft in a lower surface side of the lower case, when pressing the indicating needle onto the upper end portion of the indicating needle shaft; and
    inserting the projection portion of the jig into the concave portion, so as to receive a force acting on the indicating needle shaft from the indicating needle by the projection portion of the jig when pressing the indicating needle onto the upper and portion of the indicating needle shaft.

4. The indicating needle assembling method according to claim 3, further comprising removing the jig after the indicating needle is pressed onto the upper end portion of the indicating needle shaft.

5. A stepping motor incorporated instrument, comprising:
    a rotor;
    a stator;
    a coil attached to said stator;
    a case body including an upper case and a lower case, for housing said rotor, said stator, and said coil;
    an indicating needle shaft rotatably supported by said upper case and said lower case, having an upper end portion projecting to an outside from said upper case; and
    an indicating needle to be mounted on the upper end portion of said indicating needle shaft,
    wherein a lower surface of a bottom wall of the lower case is formed with a concave portion in a position corresponding to a shaft supporting portion of the indicating needle shaft, so as to receive a jig for supporting a lower end surface of the indicating needle shaft when assembling the indicating needle,
    the bottom wall is formed with a through-hole, which opens into the concave portion, and the indicating needle shaft is inserted into the through-hole, and
    a lower end portion of the indicating needle shaft penetrates the through-hole to project in the concave portion, without projecting out of the concave portion.

* * * * *